United States Patent

Kishigami et al.

[11] Patent Number: 6,167,057
[45] Date of Patent: Dec. 26, 2000

[54] DATA COMMUNICATION SYSTEM AND ELECTRONIC CONTROL UNIT USED THEREIN

[75] Inventors: Tomohisa Kishigami, Obu; Akihiro Sasaki, Anjo; Shigeru Uehara; Yasushi Shinojima, both of Toyota; Akihiro Tanaka, Anjo, all of Japan

[73] Assignees: Denso Corporation, Kariya; Toyota Jidosha Kabushiki Kaisha, Toyota, both of Japan

[21] Appl. No.: 09/026,181

[22] Filed: Feb. 19, 1998

[30]  Foreign Application Priority Data

Feb. 21, 1997 [JP] Japan ................................. 9-037552

[51] Int. Cl.[7] .......................... H04L 12/413; H04L 3/16; H04L 3/12
[52] U.S. Cl. ......................... 370/445; 370/470; 370/522
[58] Field of Search .................................. 370/470, 471, 370/445, 474, 522

[56]  References Cited

U.S. PATENT DOCUMENTS

| | | |
|---|---|---|
| 4,715,031 | 12/1987 | Crawford et al. . |
| 5,001,642 | 3/1991 | Botzenhardt et al. . |
| 5,293,571 | 3/1994 | Matsuda et al. . |
| 5,499,247 | 3/1996 | Matsuda et al. ........................ 370/85.3 |
| 5,856,976 | 1/1999 | Hirano ..................................... 370/401 |

FOREIGN PATENT DOCUMENTS

| | | |
|---|---|---|
| 0 612 169 A2 | 8/1994 | European Pat. Off. . |
| 0 286 383 | 10/1998 | European Pat. Off. . |

Primary Examiner—Chau Nguyen
Assistant Examiner—Toan Nguyen
Attorney, Agent, or Firm—Pillsbury Madison & Sutro LLP

[57]  ABSTRACT

In a data communication system in which many nodes are connected to a common data bus so that each node can communicate with other nodes, a data frame to be transmitted from a node to other nodes includes a message having a variable length interposed between a signal indicating the length of the message and a signal indicating the end of the message in the frame. The message and the signals are coded according to a coding rule such as NRZ, and a bit stuffing rule is applied to the signal indicating the length of the message and the message while another rule violating the bit stuffing rule is applied to the signal indicating the end of the message. When the message length is changed due to noise or other causes in the course of data transmission, the signal indicating the end of the message is clearly detected at a receiving end because it is coded according to a rule different from the rule applied to the message and other signals. Further, since the length of the message actually received at the receiving end can be compared with the signal indicating the length of the message, transmission error can be detected without fail.

8 Claims, 4 Drawing Sheets

DATA COMMUNICATION SYSTEM AND ELECTRONIC CONTROL UNIT USED THEREIN

CROSS-REFERENCE TO RELATED APPLICATION

This application is based upon and claims benefit of priority of Japanese Patent Application No. Hei-9-37552 filed on Feb. 21, 1997, the content of which is incorporated herein by reference.

BACKGROUND OF THE INVENTION

1. Field of the Invention

The present-invention relates to a data communication system in which a plurality of electronic control units are connected to a common data bus, these units communicating with one another through the common data bus, and also relates to the electronic control unit used in the system, and more particularly relates to such a system suitable for use in an automotive vehicle.

2. Description of Related Art

A data communication system of this kind has been known, in which a plurality of nodes each composed of an electronic control unit (ECU) for controlling, for example, operation of an engine or an instrument panel mounted on an automotive vehicle are connected to a common data communication bus and communicate with one another through the common data bus, as shown in FIG. 6. Each node (ECU) includes a central processing unit (CPU) for controlling electronic equipment and a communication control unit composed of a communication integrated circuit (IC) for formulating data to be transmitted and receiving data from other nodes, and a driver for transmitting and receiving data to and from the common data bus.

The communication IC formulates data to be transmitted, upon receipt of information from the CPU, according to a predetermined coding rule. For example, the data are formulated according to the well known NRZ (Non-Return-to-Zero) in which a signal level (HIGH or LOW) of a single bit is always kept constant and the well known bit stuffing rule in which a bit of a reverse level (stuff bit) is inserted in a bit stream when a certain number of the same level bits (for example, five bits) appears in series. The data are transmitted according to a certain transmission protocol, for example, the non-destructive Carrier Sense Multiple Access with Collision Detection (CSMA/CD). Under the non-destructive CSMA/CD, transmission of data from any one of the nodes starts when no data from other nodes is flowing on the common data bus to avoid data collision on the bus. However, this is not always possible when the data to be transmitted are congested. So, the data collision on the bus is always watched, and if it happens, data having a higher priority are permitted to flow on the bus while the transmission of data having a lower priority is brought to a halt. After a certain period of time, the transmission of the data brought to a halt is started again. This process is performed by bringing the signal level of the data having a higher priority to a dominant level (an active level which is HIGH or LOW according to the setting of the system).

An example of a conventional frame format for data to be transmitted is shown in FIG. 7. The frame consists of the following fields: SOF (Start of Frame), MESSAGE ID (a content of data), DESTINATION ID (an address of the node to which data are to be transmitted), DATA 1 and DATA 2 (data themselves), CRC (Cyclic Redundancy Check for detection of bit errors), CRC-DELIMITER (end of CRC), RSP (Response from a receiving node) and EOF (End of Frame). The field of MESSAGE ID and DESTINATION ID is 8 bits long, and each field of DATA 1 and DATA 2 contains one byte data, one byte being 8 bits long. CRC is 8 bits long, CRC-DELIMITER is 2 bits long, and RSP is also 2 bits long.

The conventional frame described above includes two data fields, DATA 1 and DATA 2, each having a fixed length of 8 bytes. Therefore, the data space is not long enough in case the data volume is large. It may be possible to transmit a large volume of data by dividing them into two or more sections. In this case, however, efficiency of transmission becomes low because plural frames containing these divided data sections have to be formulated. It may be also possible to increase the number of data fields. In this case, however, the frame length becomes too long, which will cause congestion on the bus.

In order to solve the problem of the fixed length of the data field, it has been proposed to make the data field length variable and to add a field for indicating the length of the data. Such a frame format has been used, for example, in the well known CAN system. In this system, when information indicating the length of the data is deformed by noise or any other reasons during the data transmission, the bit error check will not be performed correctly. For example, if the information originally indicating a data length of 8 bytes is changed to the one indicating a data length of 7 bytes, while the data length itself is 8 bytes, the last 8 bits of the data will be judged as CRC. In this case, the bit error check is done using the last 8 bits, and if the check result should be affirmative, the receiving node receives and processes the data though such a receipt is in error. Under this situation, since the RSP signal indicating a correct receipt of data transmission is not returned timely from the receiving node to the transmitting node, the transmitting node transmits again the same data, and the receiving node can receive the correct data this time. However, there is a possibility that the transmitting node does not transmit the data again even when such is necessary. That is, if the data are transmitted to plural receiving nodes, and one node receives the data in error while other nodes receive the data correctly, then the response signal RSP is returned timely from one of the other nodes correctly received the data. In this situation, the transmitting node does not repeat the data transmission, and, accordingly, the node received the data in error cannot be corrected by the correct data.

SUMMARY OF THE INVENTION

The present invention has been made in view of the above-mentioned problems, and an object of the present invention is to provide a data communication system in which the length of a data field in a frame is made variable and the data field is placed between a field indicating the length of the data and another field indicating the end of the data, thereby, enabling a receiving node (ECU) to judge erroneous receipt of the data (message) if the data are deformed during transmission, and more particularly to provide an improved frame format which is suitable in the system.

Another object of the present invention is to provide an electronic control unit for use in the data communication system according to the present invention.

The electronic control unit (ECU constituting a node) includes a central processing unit for controlling an electronic device connected to the ECU and an integrated circuit for communication (communication IC). The message or data to be transmitted to other nodes (ECUs) is sent to the communication IC where the message is coded according to a coding rule such as NRZ (Non-Return-to-Zero), Manchester rule or PWM rule. The bit stuffing rule is also applied to the coding, and the coded message is included in a communication frame which also includes other coded signals that are necessary to transmit the message to other nodes through a common data bus. The message included in the frame is transmitted to other nodes under the transmission protocol called non-destructive CSMA/CD. As a transmission protocol, destructive CSMA/CD may be also used.

The length of the message to be sent to other nodes is variable, and the message is placed between a signal indicating the length of the message and a signal indicating the end of the message in the transmission frame. The message and both signals are coded according to a predetermined coding rule such as the NRZ, and the known bit stuffing rule is applied to the coding of the message and the signal indicating the length of the message, while it is not applied to the coding of the signal indicating the end of the message. It is also possible to code only the signal indicating the end of the message according to a different rule which violates the coding rule used for the message and the signal indicating the length of the message. Thus, the signal indicating the end of the message can be surely detected at a receiving node, being distinguished from other signals, even when the original length of the message is changed due to noise or some other causes in the course of its transmission. Moreover, in case the signal indicating the end of the message is deformed or damaged in the course of transmission, such transmission is judged as an error because the signal indicating the end of the message (coded differently from other signals) cannot be detected.

Many nodes (ECUs) connected to the common data bus may be grouped in several groups so that several nodes performing a similar function belong to the same group. Some messages commonly required by the nodes belonging to a group are addressed to that group, thereby avoiding complex communication among individual nodes.

The present invention also provides an electronic control unit that includes communication means suitable for use in the data communication system according to the present invention.

Other objects and features of the present invention will become more readily apparent from a better understanding of the preferred embodiment described below with reference to the following drawings.

DETAILED DESCRIPTION OF THE PREFERRED EMBODIMENT

Figure 1:
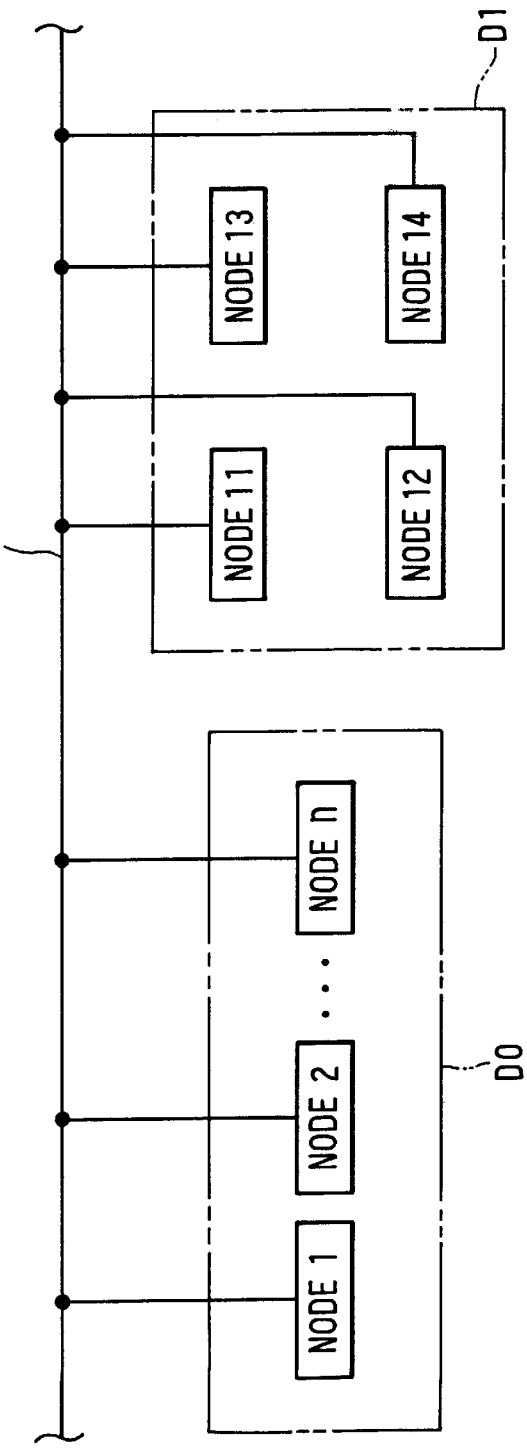
FIG. 1 is a diagram showing a communication system, used in an automotive vehicle, according to the present invention, in which various nodes are connected to a common data bus.

Referring to FIGS. 1 to 5, an embodiment according to the present invention will be described. In FIG. 1, a plurality of nodes 1 to n and 11 to 14, each composed of an electronic control unit (ECU), are connected to a common data bus L. The nodes (ECUs) 1 to n which control an engine, an instrument panel, an airconditioner, etc, respectively, constitute a node group D0. The nodes 11 to 14 are ECUs, each mounted on a respective door of an automotive vehicle, for locking/unlocking the doors and opening/closing power windows, and constitute another node group D1. All the nodes are connected to the common data bus L and perform data transmission among them equally and independently (Multi-Task Access).

Figure 2:
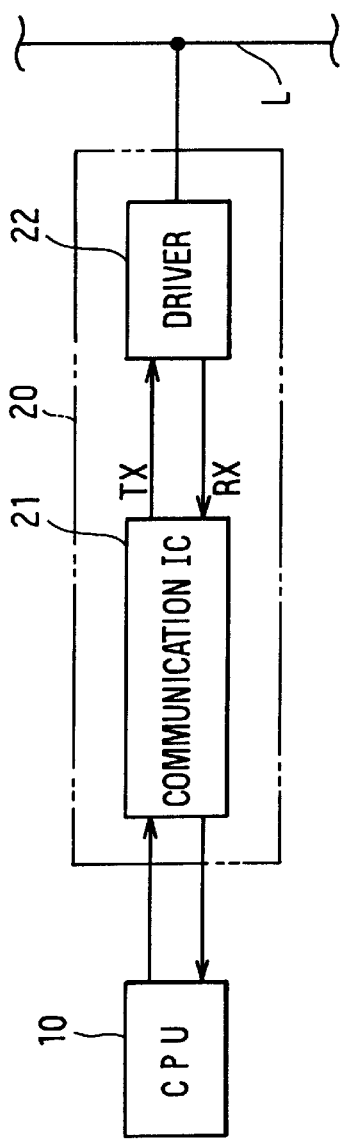
FIG. 2 is a diagram showing a node (electronic control unit) used in the communication system shown in FIG. 1 and components included therein.

As shown in FIG. 2, each node (ECU) includes a central processing unit (CPU) 10 and a communication unit 20 including a communication integrated circuit (IC) 21 and a driver 22. The communication IC 21 formulates data to be transmitted to other nodes upon receipt of information from the CPU 10. The data to be transmitted are coded according to the NRZ and the bit stuffing rule. The data transmission is performed under the transmission protocol called non-destructive CSMA/CD. The communication IC 21 transmits the coded data from a transmission terminal TX to the driver 22 and receives data sent from the driver 22 at a receiving terminal Rx. The driver 22 makes the signal level of the data to be transmitted through the common data bus a dominant level (HIGH level in this embodiment), when data collision occurs on the common bus. The dominant level means a level having a high priority and is sometimes referred to as an active level, and another level having a low priority (LOW level in this embodiment) is referred to as a recessive level, a passive level or an inactive level.

The communication IC 21 stores the memory of an individual destination ID which identifies the address of a particular node, a group destination ID which identifies the address of a group to which the particular node belongs, and a broadcast ID which designates all nodes. The communication IC 21 transfers data sent from the driver 22 to the CPU 10 when one of the IDs accords with the ID of its own node.

Figure 3:
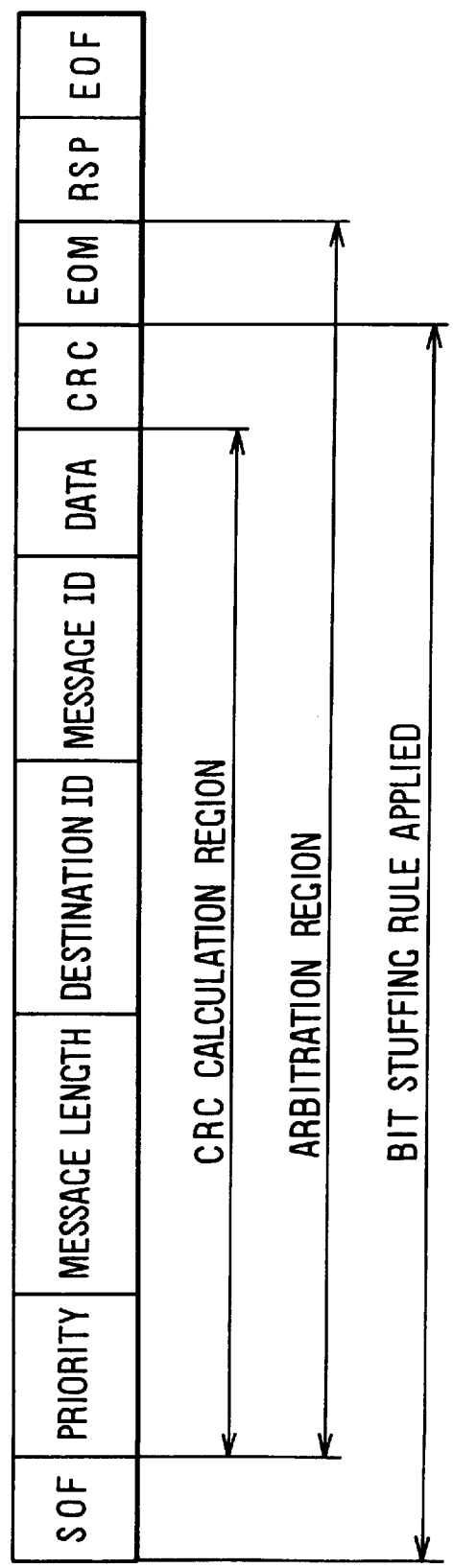
FIG. 3 shows a frame format of data to be transmitted in the communication system according to the present invention.
Figure 7:
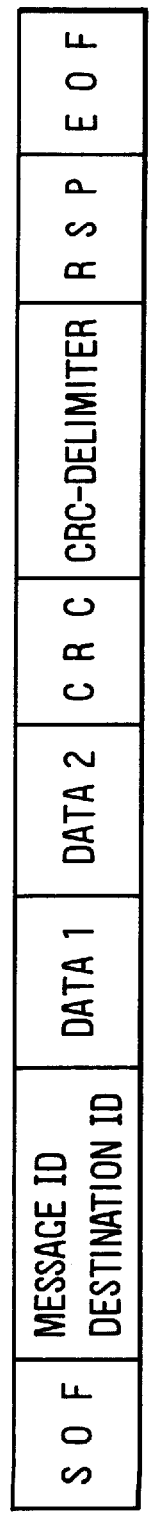
FIG. 7 shows an example of a frame format used in a conventional data communication system.

FIG. 3 shows a frame format of the data to be transmitted. The frame consists of the following fields: SOF (Start of Frame), PRIORITY (transmission priority in case of collision), MESSAGE LENGTH (a length of a message), DESTINATION ID (an address of the node to which the data are to be transmitted), MESSAGE ID (a content of a message), DATA (data themselves), CRC (Cyclic Redundancy Check for detection of bit errors), EOM (End of Message), RSP (Response from a receiving node) and EOF (End of Frame).

The SOF field is one bit long, having a dominant level indicating start of the frame. The PRIORITY field is 4 bits long, indicating priority of the frame when the transmission collision occurs on the common data bus. A signal "1 1 1 1" indicates the highest priority, and a signal "0000" indicates the lowest priority. The MESSAGE LENGTH field is 4 bits long, showing the number of bytes ML from the DESTINATION ID to the DATA. The DESTINATION ID field is 8 bits long, indicating an address to which the data is to be sent. The address shown therein is either address indicating individual nodes (individual ID), a group of nodes (group ID) or all nodes (broadcast ID). The MESSAGE ID field is 8 bits long, showing a content of the message. The DATA field has a variable length from one byte to eleven bytes, each byte being constituted by a 8 bits signal. The length of the DATA field is varied according to the data length to be sent. The CRC field is 8 bits long and contains a signal for checking bit errors. The EOM field is composed of an one bit recessive signal, a six bits dominant signal and another one bit recessive signal, the six bits dominant signal being interposed between both one bit recessive signals. Since the EOM includes the six consecutive dominant bits, it violates the bit stuffing rule because the bit stuffing rule used in the present embodiment does not permit consecutive dominant or recessive bits in excess of five. The bit stuffing rule violation is intentionally employed in the EOM so that the EOM signal is detected without fail at a receiving node. The RSP field is 2 bits long, and used as a field to show an one bit recessive signal and an one bit dominant signal sent from a receiving node when the receiving node receives the data successfully. The EOF field is composed of a six bits recessive signal indicating the end of a frame.

A CRC calculation region includes the fields from PRIORITY to DATA, and an arbitration region includes the fields from PRIORITY to EOM. The bit stuffing rule is applied to the fields from SOF to CRC. The fields from DESTINATION ID to CRC are placed between the MESSAGE LENGTH field and the EOM field. Since the DATA field, the length of which is variable, is interposed between MESSAGE LENGTH and EOM in the frame format, the frame error can be detected without fail, even when the number of bytes ML or the EOM signal is changed or deformed by noise during the data transmission. Therefore, reliability of the data transmission in the system is greatly enhanced.

Since the EOM signal is composed of a six bits consecutive dominant signal interposed between one bit recessive signals, there always appear two signal edges in the EOM signal, and accordingly, the EOM signal is surely detected. The DESTINATION ID includes not only the individual ID designating an individual node and the broadcast ID designating all the nodes but also the group ID designating a group of nodes (as exemplified as the group D0 and the group D1 in FIG. 1) which frequently receive common data. Therefore, the data which are necessary to the group can be transmitted only to that group without sending unnecessary information to other groups, thereby alleviating an operational load imposed on CPUs. For example, if the group ID designating the group D0 is set as the DESTINATION ID, the data for controlling the engine, the instrument panel and the airconditioner, etc. are transmitted to the group D0 without sending the same to the group D1. In case certain data are required by all the nodes, such data are transmitted to all of them under the broadcast ID. In this manner, the efficient data transmission can be carried out.

Figure 4:
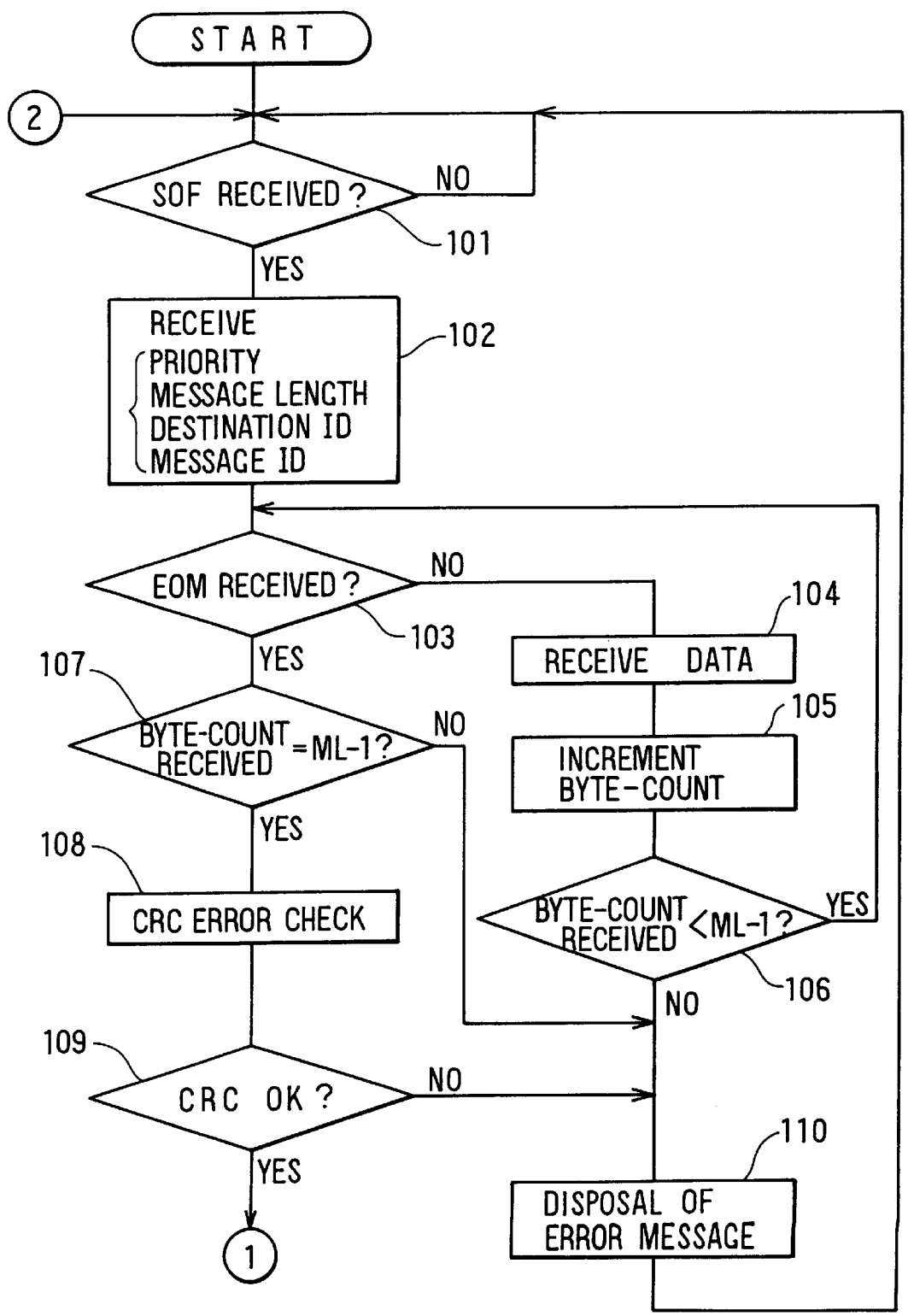
FIG. 4 is a flow chart showing process steps in a communication IC used in an electronic control unit according to the present invention.
Figure 5:
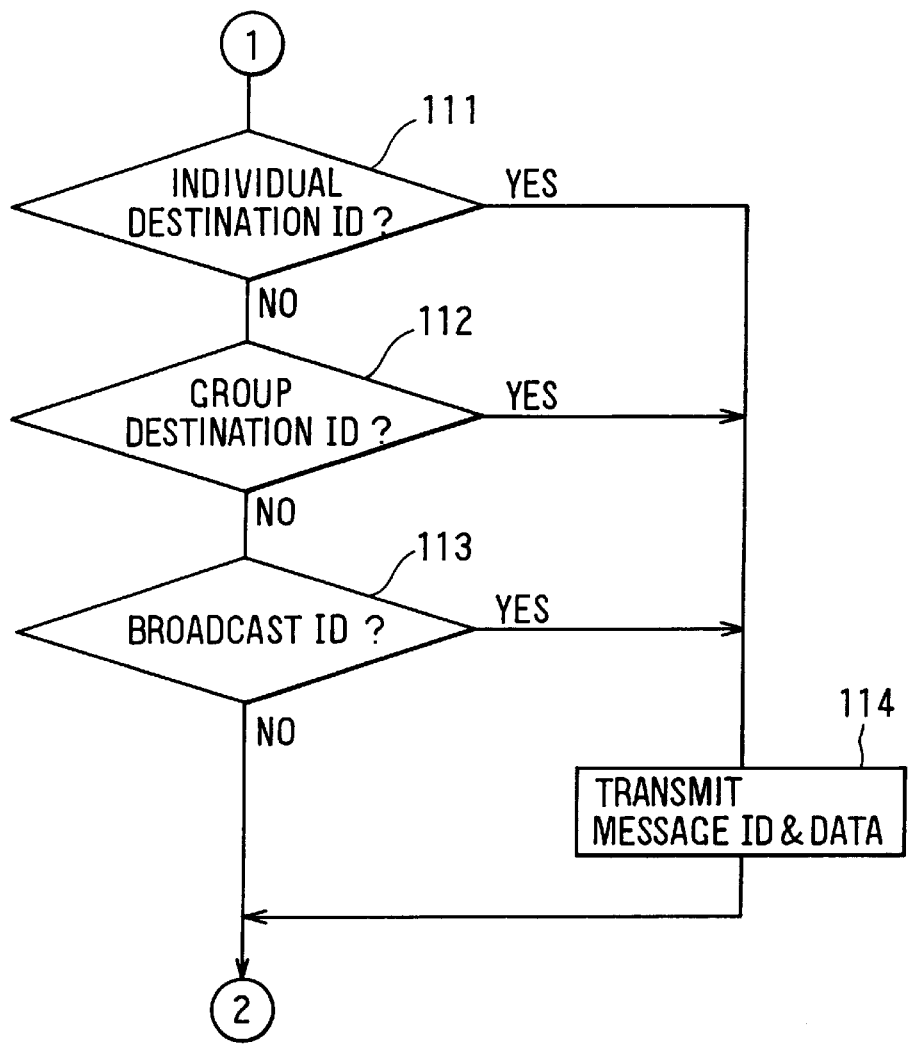
FIG. 5 is a flow chart showing the process steps following the steps shown in FIG. 4.
Figure 6:
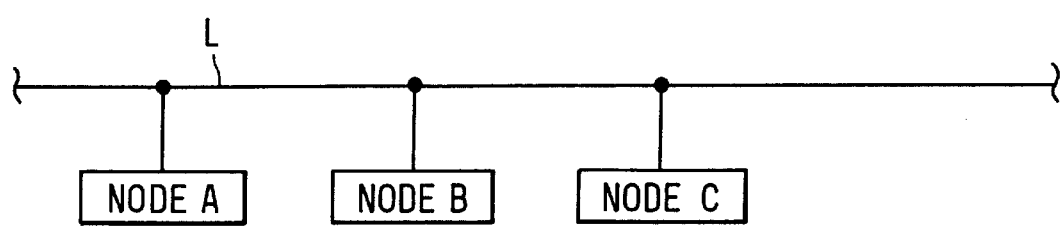
FIG. 6 is a diagram showing an example of a node connection in a conventional data communication system.

Referring to FIGS. 4 and 5 showing a process flow in the communication IC 21, the data receiving process will be described. At a step 101, whether the SOF signal is received or not is checked. When it is received, the process moves to a step 102 where the respective signals of PRIORITY, MESSAGE LENGTH (ML), DESTINATION ID AND MESSAGE ID are received. Then, at a step 103 whether the EOF signal is received is checked. If not, the process moves to 104 where the DATA signals are received. Then, at a step 105 the number of the bytes received (byte-count) is incremented, and whether the byte-count has reached a number (ML-1) at a following step 106. If the byte-count is below the number (ML-1), the process returns to the step 103 and the cycle from the step 103 to the step 106 is repeated until the EOF signal is received at the step 103. Since the number ML represents the number of bytes indicated by the MESSAGE LENGTH which includes all the number of bytes from the DESTINATION ID to the DATA (refer to FIG. 3), the number (ML-1) means the number of bytes from the beginning of DATA to the end of CRC (ML=1 byte of DESTINATION ID+1 byte of MESSAGE ID+x bytes of DATA; ML-1=x bytes of DATA+1 byte of CRC). Therefore, the fact that the byte-count is below the number (ML-1) means that all the bytes up to the end of CRC have not been received yet. The step 103 checks whether the EOF signal is received, and if YES, the process moves to a step 107. At the step 107, whether the byte-count is equal to (ML-1) is checked. The fact that the byte-count is equal to (ML-1) means that all the DATA bytes and the CRC byte have been received. Then, the process moves to a step 108 where the bit error is checked with the CRC. The result of the CRC error check is judged at a step 109, and if it is affirmative the process moves to a step 111 (in FIG. 5). Whether the DESTINATION ID accords with either one of the individual ID, the group ID or the broadcast ID is checked at steps 111, 112 or 113, respectively. If either one of the answers is YES, the process moves to a step 114 where the MESSAGE ID and the DATA are sent to the CPU 10. If the DESTINATION ID does not accord with any one of the IDs, then the data are not sent to the CPU 10, and the process returns to the step 101, thereby alleviating the load of the CPU 10. In case where either one of the answers of the steps 106, 107 and 109 is NO, then it is judged that the data are not received correctly, and the data received by that time are disposed, for example, by destroying the data at a step 110. Since the signals contained in the fields from the PRIORITY to the EOF are composed of byte units each having an 8 bits length (the PRIORITY and the MESSAGE LENGTH, each being 4 bits long, make one byte by adding both), the process can be easily programmed in an 8 bits CPU.

The communication IC 21 is not limited to the one using a CPU, but it may be composed of hard logic elements. Further, it may be integrated in the CPU 10. The common data line L shown in FIG. 1 may be changed to a data line constituted by two transmission wires. In the frame format shown in FIG. 3, the positions of the MESSAGE LENGTH and the DESTINATION ID may be exchanged, or the MESSAGE LENGTH may be placed between the MESSAGE ID and the DATA.

As a transmission protocol, the non-destructive CSMA/CD is used in the embodiment described above. However, other transmission protocols such as the destructive CSMA/CD, or the token passing scheme (both are well known in the art) may be used.

As a coding rule, the NRZ is used in the embodiment together with the bit stuffing rule. However, other coding rules such as a Manchester rule or a PWM rule may be used. According to the Manchester rule, one bit is divided into two parts, one part having a HIGH level and other part having a LOW level, and any bit indicating a HIGH starts with the part having the HIGH level and any bit indicating a LOW starts with the part having the LOW level, thereby making one edge always in the center of a bit. According to the PWM rule, one bit is divided into three parts composed of two consecutive HIGH parts followed by one LOW part or one HIGH part followed by two consecutive LOW parts. Any HIGH bit starts with the two consecutive HIGH parts and any LOW bit starts with the single HIGH part, thereby making one edge at a position of a two-thirds distance from the start of HIGH bit and at a position of an one-third distance from the start of LOW bit. Within the scope of the present invention, the NRZ coding rule may be used without combining the bit stuffing rule, if the Manchester or the PWM is applied to the EOF field. In this case, the EOF is detected because it violates the NRZ rule. Coding efficiency in this case, however, is somewhat sacrificed because two different coding rules are used in a frame. Further, the Manchester rule or the PWM rule may be used as a main coding rule in a frame, while applying the NRZ only to the EOF field. In this case, a decoder circuit will be a little more complex, compared with the case of the embodiment described above.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A data communication system comprising:
  a common data bus; and
  a plurality of electronic control units, each including a central processing unit for controlling an electronic device and communication means, connected to the common data bus, each electronic control unit communicating with other electronic control units under a predetermined data transmission protocol through the common data bus, the communication means forming a communication frame that includes a message to be transmitted and other information necessary to transmit the message to other electronic control units;
  wherein a length of the message is variable;
  wherein the message is placed between a signal indicating the length of the message and an error check code, and a signal indicating an end of the message is placed immediately after the error check code; and
  wherein the message, the signal indicating the length of the message, and the error check code are coded according to a predetermined coding rule, and the signal indicating the end of the message is coded according to another coding rule, the other coding rule violating the predetermined coding rule.

2. A data communication system as in claim 1, wherein the predetermined data transmission protocol is non-destructive.

3. A data communication system as in claim 1, wherein the predetermined coding rule is NRZ (Non-Return-to-Zero) to which a bit stuffing rule is applied.

4. A data communication system as in claim 1, wherein:
  each electronic control unit has its individual address for receiving the message transmitted from other electronic control units;
  a plurality of electronic control units are divided into groups each having its group address for receiving the message transmitted from other electronic control units; and
  the message includes either individual address or group address to which the message is to be delivered.

5. A data communication system as in claim 4, wherein the message includes a broadcast address in place of the individual or the group address, in case the message is to be delivered to all electronic control units.

6. An electronic control unit connected to a common data bus, the electronic control unit communicating with other electronic control units also connected to the common data bus under a predetermined transmission protocol through the common data bus, the electronic control unit comprising:
  a central processing unit for controlling an electronic device; and
  communication means for forming a communication frame that includes a message from the central processing unit to be transmitted to other electronic control units and other information necessary for the message transmission;
  wherein a length of the message is variable;
  wherein the message is placed between a signal indicating the length of the message and an error check code, and a signal indicating an end of the message is placed immediately after the error check code; and
  wherein the message, the signal indicating the length of the message, and the error check code are coded according to a predetermined coding rule, and the signal indicating the end of the message is coded according to another coding rule, the other coding rule violating the predetermined coding rule.

7. A data communication system as in claim 3, wherein:
  the bit stuffing rule applied to the message and the signal indicating the length of the message is a rule in which a reverse level bit is inserted in a bit stream when a certain number of the same level bits appears in series in the bit stream; and
  another coding rule applied to the signal indicating the end of the message violates the bit stuffing rule in having no reverse level bit inserted in the bit stream when the certain number of the same level bits appears in series in the bit stream.

8. An electronic control unit as in claim 6, wherein:
  the predetermined coding rule is NRZ (Non-Return-to-Zero) to which a bit stuffing rule is applied, the bit stuffing rule being a rule in which a reverse level bit is inserted in a bit stream when a certain number of the same level bits appears in series in the bit stream; and
  another coding rule violating the predetermined coding rule does not include the bit stuffing rule.

* * * * *